US008681515B2

(12) United States Patent
Bae et al.

(10) Patent No.: US 8,681,515 B2
(45) Date of Patent: Mar. 25, 2014

(54) ENERGY GENERATION SYSTEM AND ANTI ISLANDING PROTECTING METHOD THEREOF

(75) Inventors: Young Sang Bae, Seoul (KR); Seong Jin Oh, Seoul (KR); Kyoung Hwan Kim, Gyeonggi-do (KR)

(73) Assignee: Kaco New Energy Inc., Gyeonggi-do (KR)

( * ) Notice: Subject to any disclaimer, the term of this patent is extended or adjusted under 35 U.S.C. 154(b) by 285 days.

(21) Appl. No.: 13/278,992

(22) Filed: Oct. 21, 2011

(65) Prior Publication Data

US 2013/0058139 A1 Mar. 7, 2013

(30) Foreign Application Priority Data

Sep. 5, 2011 (KR) .......................... 10-2011-0089490

(51) Int. Cl.
*H02M 5/45* (2006.01)

(52) U.S. Cl.
USPC .................................. 363/36; 363/79; 363/95

(58) Field of Classification Search
USPC ................ 363/36, 40, 56.03, 56.05, 79, 95
See application file for complete search history.

(56) References Cited

U.S. PATENT DOCUMENTS

| 5,384,696 | A | * | 1/1995 | Moran et al. | 363/40 |
|---|---|---|---|---|---|
| 5,850,132 | A | * | 12/1998 | Garces | 318/599 |
| 6,004,056 | A | * | 12/1999 | De Laforcade | 401/190 |
| 6,472,775 | B1 | * | 10/2002 | Huang et al. | 307/105 |
| 6,604,056 | B2 | * | 8/2003 | Ulrich | 702/60 |
| 6,977,827 | B2 | * | 12/2005 | Gritter | 363/40 |
| 7,778,053 | B2 | * | 8/2010 | Gritter | 363/42 |
| 8,295,063 | B2 | * | 10/2012 | Gong et al. | 363/40 |
| 2007/0189045 | A1 | * | 8/2007 | Gritter | 363/40 |
| 2009/0244937 | A1 | * | 10/2009 | Liu | 363/46 |
| 2012/0063179 | A1 | * | 3/2012 | Gong et al. | 363/40 |

FOREIGN PATENT DOCUMENTS

| JP | 2005-094921 A | 4/2005 |
|---|---|---|
| KR | 10-2010-0025439 A | 3/2010 |

OTHER PUBLICATIONS

Korea Office Action of 10-2011-0089490 issued on Sep. 20, 2012.

* cited by examiner

*Primary Examiner* — Adolf Berhane
*Assistant Examiner* — Lakaisha Jackson
(74) *Attorney, Agent, or Firm* — Rabin & Berdo, P.C.

(57) ABSTRACT

An energy generation system includes an inverter for converting a DC voltage into an AC voltage, a three-phase/two-phase transformer for transforming an output of the inverter into a three-phase/two-phase stationary coordinate system, a phase locked loop for calculating the phase and frequency of an output voltage of the inverter, a phase shifter for generating a current phase reference value, a current reference coordinate transformer for transforming the current phase reference value and the current amplitude reference value into a two-phase stationary coordinate system, a current phase calculator for outputting a current phase calculation value, a current phase calculator for outputting a current amplitude calculation value, a current adjuster for generating a current adjustment signal, an output three-phase transformer for transforming the current adjustment signal into a current adjustment signal in a three-phase stationary coordinate system, and a PWM controller for outputting a PWM control signal.

14 Claims, 2 Drawing Sheets

ENERGY GENERATION SYSTEM AND ANTI ISLANDING PROTECTING METHOD THEREOF

CROSS-REFERENCE TO RELATED APPLICATION

The present application claims benefit under 35 U.S.C. §119(a) to Korean patent application No. 10-2011-0089490, filed on Sep. 5, 2011, the disclosure of which is expressly incorporated by reference herein in its entirety.

BACKGROUND OF THE INVENTION

1. Field of the Invention

The present invention relates to a new and renewable energy generation system, and more particularly, to an anti-islanding protection method of the new and renewable energy generation system.

2. Description of the Related Art

Up to now, various anti-islanding protection methods used in a photovoltaic generation system have been developed. The islanding detection methods may be classified into a passive method and an active method. The Over/Under voltage and frequency detection method, which is the most general passive method, is to stop an inverter when a detected voltage/frequency is deviated from a preset value. While the method is simple, it fails to detect islanding when power generated by the inverter is identical to the capacity of a load connected with a grid.

In the phase jump detection method, the phase of inverter current is instantaneously synchronized with a grid voltage through a phase locked loop (PLL) circuit, wherein a phase difference of a predetermined size is recognized as an occurrence of islanding. However, this method fails when the load power factor is one.

The voltage harmonic monitoring method uses a principle that, when a photovoltaic generation system is in an islanding state, the voltage harmonic component increases due to exciting current supplied to a distribution transformer. However, when a non-linear load exists, setting an appropriate harmonic value to disconnect an inverter is nearly impossible.

These passive methods have a defect that there exists a non-detection zone (NDZ). The passive detection methods have a problem in that detecting an islanding operation is impossible in a specific situation, for example, in a case where a voltage, a frequency, or a change therein is very small.

Methods of introducing a predetermined change portion into the inverter output in order to remove the non-detection zone are called active methods.

In the output power variation method, the output voltage is continuously observed while the effective power of the inverter is being periodically perturbed. When islanding occurs, voltage fluctuations become large due to effective power mismatching, which makes it possible to stop the system. However, this method is ineffective due to the averaging effect.

The active frequency drift (AFD) method is to observe the frequency of a terminal voltage while minutely increasing or decreasing the frequency of the output current of the inverter. The frequency of the terminal voltage exceeding a predetermined range indicates islanding. However, this method has a defect that it is easy to fail when the phase angle of a load is identical to a phase value generated by a changed portion in the frequency.

The sliding mode frequency shift (SMS) method is applied in a similar manner as that of the AFD method. In this method, the starting angle of inverter current is controlled, and a change in the frequency generated under islanding is observed. This method also fails in detecting an islanding operation when the phase of load current is equal to the starting angle of the output current of the inverter.

The active methods have an advantage in that it is possible to reduce the non-detection zone caused in the passive methods, but has a disadvantage in that forcibly introducing a minute change signal into the output of an inverter degrades the quality of power and reduces the output efficiency of the inverter.

SUMMARY OF THE INVENTION

Accordingly, the present invention has been made in an effort to solve the problems occurring in the related art, and an object of the present invention is to provide a new and renewable energy generation system which can reduce the non-detection zone while minimizing reduction in the quality of power, and an anti-islanding protection method thereof.

In addition, another object of the present invention is to provide a new and renewable energy generation system using a hybrid detection scheme in which a passive detection scheme and an active detection scheme are compounded, and an anti-islanding protection method of the system.

In addition, still another object of the present invention is to provide a new and renewable energy generation system in which a passive detection scheme is primarily used and an active detection scheme is secondarily used, and an anti-islanding protection method of the system.

In addition, still another object of the present invention is to provide a new and renewable energy generation system in which a passive detection scheme is used by arriving at a first preset value and an active detection scheme is used by arriving at a second preset value, and an anti-islanding protection method of the system.

In addition, still another object of the present invention is to provide a new and renewable energy generation system capable of generating an AC-component current adjustment signal and pulse width modulation control signal, and an anti-islanding protection method of the system.

In order to achieve the above object, according to one aspect of the present invention, there is provided a new and renewable energy generation system having an anti-islanding protection function, the new and renewable energy generation system including: an inverter configured to convert a DC voltage supplied from a new and renewable energy source into an AC voltage; a three-phase/two-phase transformer configured to transform a three-phase output of the inverter into a two-phase stationary coordinate system; a phase locked loop configured to calculate a phase and frequency of an output voltage of the inverter using a two-phase voltage outputted from the three-phase/two-phase transformer; a phase shifter configured to selectively compare the frequency of the output voltage of the inverter with a plurality of mutually different threshold values through use of the frequency of the output voltage outputted from the phase locked loop and a current amplitude reference value applied from an exterior, and to generate a current phase reference value for shifting an output phase of the inverter; a current reference coordinate transformer configured to transform the current phase reference value outputted from the phase shifter and the current amplitude reference value into a two-phase stationary coordinate system through use of a phase angle outputted from the phase locked loop; a current phase calculator configured to subtract a phase component of output current of the inverter, which is outputted from a current two-phase transformer, from the current phase reference value in the two-phase stationary coordinate system outputted from the current reference coordinate transformer, and to output a current phase calculation value; a current amplitude calculator configured to subtract an amplitude component of output current of the inverter, which is outputted from the current two-phase transformer, from the current amplitude reference value in the two-phase stationary coordinate system outputted from the current reference coordinate transformer, and to output a current amplitude calculation value; a current adjuster configured to generate a current adjustment signal using the current phase calculation value and the current amplitude calculation value; an output three-phase transformer configured to transform the current adjustment signal in the two-phase stationary coordinate system, which is outputted from the current adjuster, into a current adjustment signal in a three-phase stationary coordinate system; and a PWM controller configured to output a PWM control signal to the inverter using the current adjustment signal in the three-phase stationary coordinate system, which is outputted from the output three-phase transformer.

According to the present invention, the three-phase/two-phase transformer includes: a voltage two-phase transformer configured to transform a three-phase output voltage of the inverter into the two-phase stationary coordinate system; and the current two-phase transformer configured to transform three-phase output current of the inverter into the two-phase stationary coordinate system.

According to the present invention, the new and renewable energy generation system having the anti-islanding protection function may further include a non-detection zone setting unit configured to set a non-detection zone so as not to shift the phase of the output current of the inverter when the frequency of the output voltage of the inverter outputted from the phase locked loop varies within a predetermined range.

According to the present invention, in the new and renewable energy generation system having the anti-islanding protection function, the current phase reference value applied to the current phase calculator may further include an inactive current compensation value to compensate for an inactive current portion in the inverter.

According to the present invention, the phase shifter does not shift the phase of the output current of the inverter when the frequency of the output voltage of the inverter is less than a first threshold value.

According to the present invention, the phase shifter gradually increases the phase of the output current of the inverter when the frequency of the output voltage of the inverter is greater than a first threshold value and is less than a second threshold value.

According to the present invention, the phase shifter fixes the phase of the output current of the inverter at a predetermined value when the frequency of the output voltage of the inverter is greater than a second threshold value.

According to the present invention, the current adjuster may use a proportional-resonant controller to generate the current adjustment signal.

According to another aspect of the present invention, there is provided an anti-islanding protection method of a new and renewable energy generation system, the method including: step 1 of measuring a voltage and current which are outputted from an inverter; step 2 of transforming the measured voltage and current in a three-phase stationary coordinate system into a voltage and current in a two-phase stationary coordinate system; step 3 of calculating a phase and a frequency of an output voltage of the inverter using a voltage signal in the two-phase stationary coordinate system; step 4 of determining whether the calculated frequency has a value within a non-detection zone; and step 5 of increasing the phase of an output current of the inverter in an identical direction when the calculated frequency is deviated from the non-detection zone.

According to the present invention, the anti-islanding protection method of the new and renewable energy generation system may further include step 6 of fixing a phase of an output current of the inverter as a maximum current phase angle when the calculated frequency arrives at a threshold value through the increasing in the equal direction.

According to still another aspect of the present invention, there is provided a photovoltaic generation system having an anti-islanding protection function, the system including: a means for not shifting a phase of an output current of an inverter when a frequency of an output voltage of the inverter is less than a first threshold value; a means for gradually increasing the phase of the output current of the inverter when the frequency of the output voltage of the inverter is greater than the first threshold value and is less than a second threshold value; and a means for fixing the phase of the output current of the inverter at a predetermined value and separating an energy supply source of the inverter from a grid when the frequency of the output voltage of the inverter is greater than the second threshold value, wherein current amplitude and phase control signals for controlling the inverter are generated in a stationary coordinate system.

According to still another aspect of the present invention, there is provided an anti-islanding protection method of a photovoltaic generation system, the method including the steps of: not shifting a phase of an output current of an inverter when a frequency of an output voltage of the inverter is less than a first threshold value; gradually increasing the phase of the output current of the inverter when the frequency of the output voltage of the inverter is greater than the first threshold value and is less than a second threshold value; and fixing the phase of the output current of the inverter at a predetermined value and separating an energy supply source of the inverter from a grid when the frequency of the output voltage of the inverter is greater than the second threshold value, wherein current amplitude and phase control signals for controlling the inverter are generated in a stationary coordinate system.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
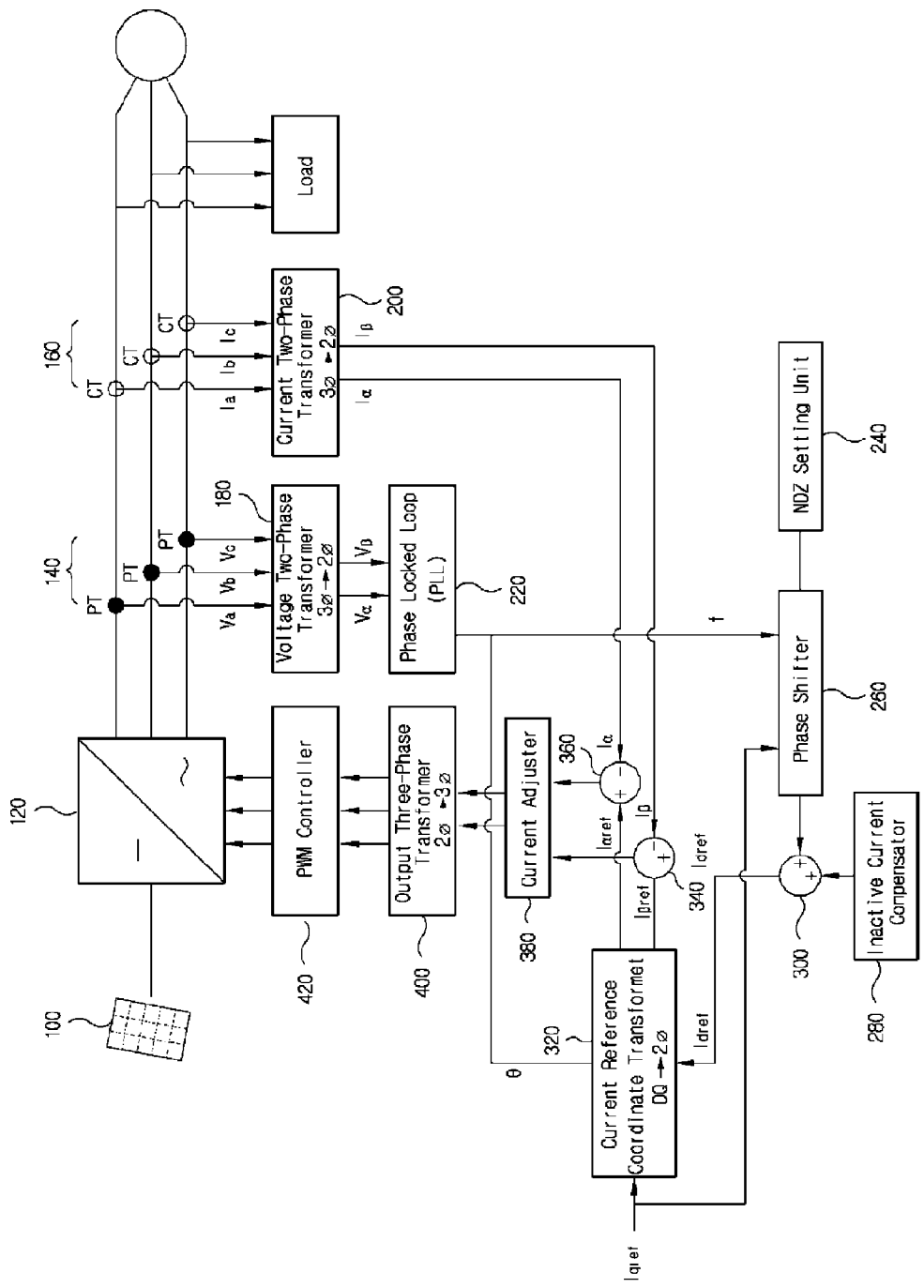
FIG. 1 is a block diagram illustrating the entire configuration of a photovoltaic generation system according to an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts. In the below description, many particular items are shown, but these are given only for providing the general understanding of the present invention. It will be understood by those skilled in the art that the present invention can be embodied without these particular items. In addition, in the following description, a detailed description of known functions and configurations incorporated herein will be omitted when it may obscure the subject matter of the present invention.

According to the present invention, until the frequency or phase of an output voltage of an inverter arrives at a first threshold value, a passive scheme of simply detecting the frequency or phase of the output voltage of the inverter is used. However, since the output of the inverter in a normal state is not forcibly disturbed, it is inevitable that there exists some non-detection zone.

When the frequency or phase of an output voltage of an inverter arrives at the first threshold value, a new and renewable energy generation system infers that the new and renewable energy generation system has been isolated from a grid, and gradually increases the frequency or phase of output current of the inverter. Thereafter, when the frequency or phase of an output voltage of an inverter arrives at a second threshold value, The new and renewable energy generation system determines that the new and renewable energy generation system has been isolated from the grid, and separates the new and renewable energy generation system from the grid through a switch of an over frequency relay and under frequency relay (OFR/UFR).

That is to say, first, inactive power is passively detected at the output terminal of the inverter, thereby inferring that the new and renewable energy generation system has been isolated from the grid. Secondarily, it is decided that the new and renewable energy generation system has been isolated from the grid in such a manner as to make a confirmation while disturbing the output current of the inverter through adjustment of inactive power.

FIG. 1 is a block diagram illustrating the entire configuration of a photovoltaic generation system according to an embodiment of the present invention.

According to an embodiment of the present invention, a photovoltaic generation system includes a photovoltaic module 100, an inverter 120, a potential transformer 140, a current transformer 160, a voltage two-phase transformer 180, a current two-phase transformer 200, a phase locked loop 220, a non-detection zone setting unit 240, a phase shifter 260, an inactive current compensator 280, a phase reference value calculator 300, a current reference coordinate transformer 320, a current amplitude calculator 340, a current phase calculator 360, a current adjuster 380, a output three-phase transformer 400, a PWM controller 420, and an OFR/UFR (not shown).

The photovoltaic module 100 has a structure in which solar cells are connected in the longitudinal and transverse directions, and generates electrical energy through the photoelectric effect according to incident photovoltaic energy.

The inverter 120 converts direct current (DC) power supplied from the photovoltaic module 100 into alternating current (AC) power. According to an embodiment of the present invention, a three-phase inverter is used to convert a DC voltage into a three-phase AC voltage.

The potential transformer (PT) 140 measures the output voltage of the inverter 120, and the current transformer (CT) 160 measures the output current of the inverter 120.

The voltage two-phase transformer 180 receives a three-phase voltage signal (Va, Vb, Vc) from the potential transformer 140, and outputs a voltage signal (Vα, Vβ) in a two-phase stationary coordinate system (α, β).

The current two-phase transformer 200 receives a three-phase current signal (1a, 1b, 1c) from the current transformer 160, and outputs a current signal (Iα, Iβ) in the two-phase stationary coordinate system (α, β).

The phase locked loop (PLL) 220 receives the output (Vα, Vβ) of the voltage two-phase transformer 180, and calculates the phase and frequency of the output voltage of the inverter.

The non-detection zone setting unit 240 sets a non-detection zone and outputs a non-detection zone setting value so as not to adjust the phase of the output current of the inverter 120 when the frequency of the output voltage of the inverter 120, outputted from the PLL 220, minutely varies within a predetermined zone. Meanwhile, the non-detection zone may be optionally set.

The phase shifter 260 generates a reference value which is used to shift the phase of the output current of the inverter 120 when the frequency outputted from the phase locked loop exceeds the non-detection zone, using the non-detection zone setting value and a current amplitude component reference value Iqref applied from an exterior, wherein Equation 1 is applied.

$$\theta_F = \begin{cases} -\theta_M & \text{if } f_{Load[K-1]} < 59.3 \text{ Hz} \\ \theta_M \sin\left[\frac{\pi}{2} \frac{(f_{Load[K-1]} - f_{grid})}{f_M - f_{grid}}\right] & \text{if } 59.3 \text{ Hz} < f_{Load[K-1]} < 60.7 \text{ Hz} \\ \theta_M & \text{if } f_{Load[K-1]} > 60.7 \text{ Hz} \end{cases} \quad (1)$$

$\theta_F$: Control Phase Angle of Output Current
$\theta_M$: Maximum Control Phase Angle of Output Current
$f_{[K-1]}$: Frequency Measured in Previous Cycle
$f_M$: Measured Frequency
$f_{grid}$: Rated Frequency of Grid (e.g. 60 Hz)

When the frequency $f_{[K-1]}$ measured in a previous cycle is equal to or less than 59.3 Hz, or is equal to or greater than 60.7 Hz, the maximum control phase angle of the output current is fixed at $\pm\theta_M$ so as to fix the maximum inactive power component (Q/P) flowing into the grid. For example, when an inactive power component (Q/P) is set to 6%, $\theta_M=3.4336°$.

In contrast, when the frequency $f_{[K-1]}$ measured in a previous cycle is greater than 59.3 Hz and is less than 60.7 Hz, the phase shifter 260 shifts the control phase of the output current into the form of a sine wave, as shown in Equation 1.

The inactive current compensator 280 compensates for an inactive current portion of a capacitance component in the inverter 120. This is to compensate for a decrease in the load power factor which is caused by the capacitance component of an LC filter included in the inverter 120. An inactive current compensation portion may be optionally determined.

The phase reference value calculator 300 adds the reference value outputted from the phase shifter 260 and the inactive current compensation portion outputted from the inactive current compensator 280, and thus outputs a d-axis current reference value, i.e., a current phase component reference value Idref.

The current reference coordinate transformer 320 transforms the current amplitude component reference value Iqref applied from an exterior and the current phase component reference value Idref outputted from the phase reference value calculator 300, into the 2-phase stationary coordinates (Iα, Iβ) using a phase angle θ outputted from the phase locked loop, and then outputs the shifted values.

The current amplitude calculator 340 subtracts the amplitude component (Iβ) of the output current of the inverter, which is outputted by the current two-phase transformer 200, from a current amplitude component reference value Iβref outputted by the current reference coordinate transformer 320, and then outputs a current amplitude calculation value Iβref−Iβ.

The current phase calculator 360 subtracts the phase component (Iα) of the output current of the inverter, which is outputted by the current two-phase transformer 200, from a current phase component reference value Iαref outputted by the current reference coordinate transformer 320, and then outputs a current phase calculation value Iαref−Iα.

The current adjuster 380 receives the current amplitude calculation value Iβref−Iβ outputted from the current amplitude calculator 340 and the current phase calculation value Iαref−Iα outputted from the current phase calculator 360, and generates a current adjustment signal. Since the values are AC values in the stationary coordinate system, the current adjuster 380 can generate a current adjustment signal using a P-resonant controller.

The output three-phase transformer 400 transforms the two-phase current adjustment signal in the stationary coordination system, which has been generated by the current adjuster 380, into a three-phase current adjustment signal in the stationary coordination system, and outputs the three-phase current adjustment signal.

The PWM controller 420 outputs a PWM control signal to control the output current of the inverter, using the three-phase current adjustment signal outputted from the output three-phase transformer 400, wherein the PWM control signal is provided to the inverter and thus the output current of the inverter is adjusted.

The OFR/UFR (not shown) represents an over frequency relay and under frequency relay. When the output frequency of the inverter is deviated from the second threshold value, the new and renewable energy generation system, e.g. a photovoltaic generation system, is determined to be in islanding operation, the OFR/UFR separates the photovoltaic generation system from the grid.

Figure 2:
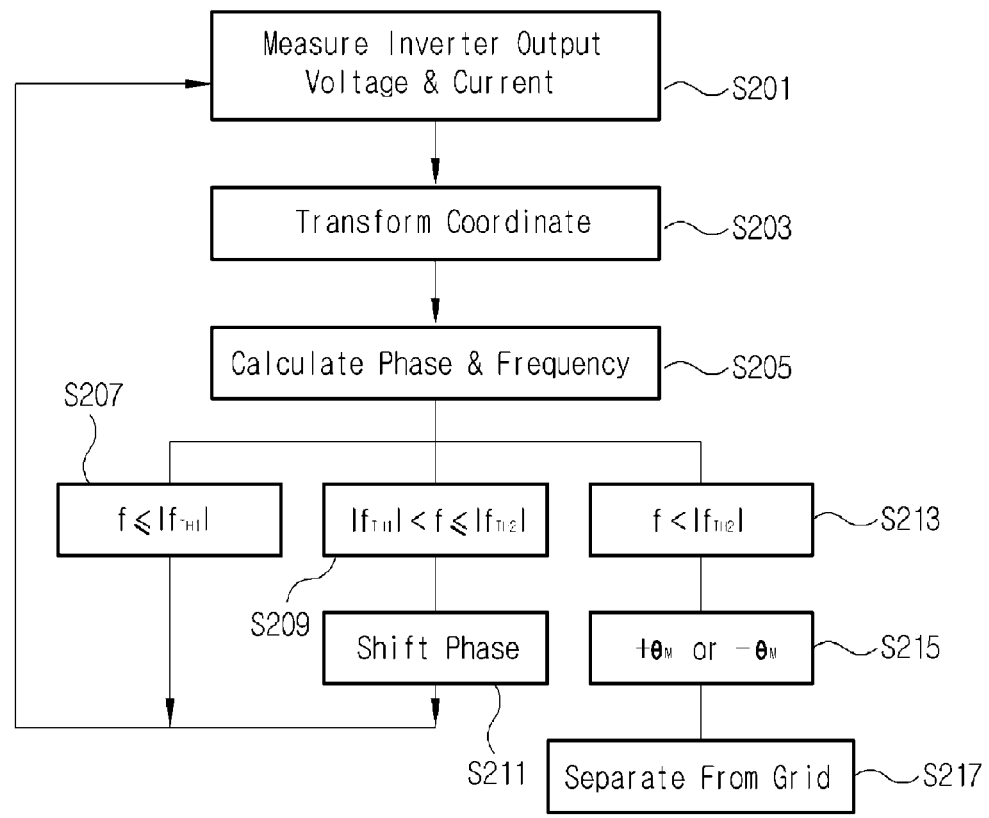
FIG. 2 is a flowchart illustrating an anti-islanding protection method according to an embodiment of the present invention.

FIG. 2 is a flowchart illustrating an anti-islanding protection method according to an embodiment of the present invention.

The voltage and current outputted from the inverter 120 are measured by means of a potential transformer (PT) and a current transformer (CT) in step S201, and the measured three-phase voltage and current are transformed into two-phase voltage signal (Vα, Vβ) and current signal (Iα, Iβ) in step S203. The phase and frequency of the output voltage of the inverter are calculated using the voltage signal (Vα, Vβ) in step S205.

When the non-detection zone setting unit 240 determines that the calculated frequency has a value within a predetermined non-detection zone (−fTH1≤f≤+fTH1) in step S207, the procedure returns to step S201.

Meanwhile, when the calculated frequency is deviated from the predetermined non-detection zone and is equal to or less than a second threshold value (±fTH2) in step S209, the phase shifter 260 shifts the phase of the output current of the inverter by performing a control algorithm according to Equation 1 in order to change an inactive current component in step S211, and the procedure returns to step S201.

Thereafter, when the calculated frequency exceeds the second threshold value (±fTH2) in step S213, the phase shifter 260 fixes the phase of the output current of the inverter at a predetermined value $\pm\theta_M$ in step S215. Thereafter, when the calculated frequency is maintained at a state of exceeding the second threshold value (±fTH2) during a predetermined period of time, the photovoltaic generation system is separated from the grid in step S217.

As is apparent from the above description, the present invention provides a new and renewable energy generation system using a hybrid-type scheme in which the passive scheme and the active scheme are compounded, so that it is possible to reduce the non-detection zone caused in the passive scheme. In addition, when the inverter operates in connection with a grid, the inverter can run without a disturbance signal introduced to the output of the inverter, so that it is possible to improve the efficiency of the inverter and the quality of power.

Although a preferred embodiment of the present invention has been described for illustrative purposes, those skilled in the art will appreciate that various modifications, additions and substitutions are possible, without departing from the scope and the spirit of the invention as disclosed in the accompanying claims. Accordingly, the scope of the invention is not to be limited by the above embodiments but by the claims and the equivalents thereof.

What is claimed is:

1. An energy generation system having an anti-islanding protection function, the energy generation system comprising:

an inverter configured to convert a DC voltage supplied from energy source into an AC voltage;

a three-phase/two-phase transformer configured to transform a three-phase output of the inverter into a two-phase stationary coordinate system;

a phase locked loop configured to calculate a phase and frequency of an output voltage of the inverter using a two-phase voltage outputted from the three-phase/two-phase transformer;

a phase shifter configured to selectively compare the frequency of the output voltage of the inverter with a plurality of mutually different threshold values through use of the frequency of the output voltage outputted from the phase locked loop and a current amplitude reference value applied from an exterior, and to generate a current phase reference value for shifting an output phase of the inverter;

a current reference coordinate transformer configured to transform the current phase reference value outputted from the phase shifter and the current amplitude reference value into a two-phase stationary coordinate system through use of a phase angle outputted from the phase locked loop;

a current phase calculator configured to subtract a phase component of output current of the inverter, which is outputted from a current two-phase transformer, from the current phase reference value in the two-phase stationary coordinate system outputted from the current reference coordinate transformer, and to output a current phase calculation value;

a current amplitude calculator configured to subtract an amplitude component of output current of the inverter, which is outputted from the current two-phase transformer, from the current amplitude reference value in the two-phase stationary coordinate system outputted from the current reference coordinate transformer, and to output a current amplitude calculation value;

a current adjuster configured to generate a current adjustment signal using the current phase calculation value and the current amplitude calculation value;

an output three-phase transformer configured to transform the current adjustment signal in the two-phase stationary coordinate system, which is outputted from the current adjuster, into a current adjustment signal in a three-phase stationary coordinate system; and a PWM controller configured to output a PWM control signal to the inverter using the current adjustment signal in the three-phase stationary coordinate system, which is outputted from the output three-phase transformer.

2. The system according to claim 1, wherein the three-phase/two-phase transformer comprises:
a voltage two-phase transformer configured to transform a three-phase output voltage of the inverter into the two-phase stationary coordinate system; and
the current two-phase transformer configured to transform three-phase output current of the inverter into the two-phase stationary coordinate system.

3. The system according to claim 1, further comprising a non-detection zone setting unit configured to set a non-detection zone so as not to shift the phase of the output current of the inverter when the frequency of the output voltage of the inverter outputted from the phase locked loop varies within a predetermined range.

4. The system according to claim 1, wherein the current phase reference value applied to the current phase calculator further comprises an inactive current compensation value to compensate for an inactive current portion in the inverter.

5. The system according to claim 1, wherein the phase shifter does not shift the phase of the output current of the inverter when the frequency of the output voltage of the inverter is less than a first threshold value.

6. The system according to claim 1, wherein the phase shifter gradually increases the phase of the output current of the inverter when the frequency of the output voltage of the inverter is greater than a first threshold value and is less than a second threshold value.

7. The system according to claim 6, wherein gradually increasing the phase of the output current of the inverter is implemented by a following equation:

$$\theta_F = \theta_M \sin\left[\frac{\pi}{2} \frac{(f_{Load[K-1]} - f_{grid})}{f_M - f_{grid}}\right],$$

wherein $\theta_F$ represents a control phase angle of the output current, $\theta_M$ represents a maximum control phase angle of the output current, $f_{[K-1]}$ represents a frequency measured in a previous cycle, $f_M$ represents a measured frequency, and $f_{grid}$ represents a rated frequency of a grid which is electrically connected with an output terminal of the inverter.

8. The system according to claim 1, wherein the current adjuster uses a proportional-resonant controller to generate the current adjustment signal.

9. The system according to claim 1, wherein the phase shifter fixes the phase of the output current of the inverter at a predetermined value when the frequency of the output voltage of the inverter is greater than a second threshold value.

10. An anti-islanding protection method of an energy generation system, the method comprising:
step 1 of measuring a voltage and current which are outputted from an inverter;
step 2 of transforming the measured voltage and current in a three-phase stationary coordinate system into a voltage and current in a two-phase stationary coordinate system;
step 3 of calculating a phase and a frequency of an output voltage of the inverter using a voltage signal in the two-phase stationary coordinate system;
step 4 of determining whether the calculated frequency has a value within a non-detection zone; and
step 5 of increasing the phase of an output current of the inverter in an identical direction when the calculated frequency is deviated from the non-detection zone.

11. The method according to claim 10, further comprising step 6 of fixing a phase of an output current of the inverter as a maximum current phase angle when the calculated frequency arrives at a threshold value through the increasing in the equal direction.

12. The method according to claim 10, wherein step 5 is performed with a following equation:

$$\theta_F = \theta_M \sin\left[\frac{\pi}{2} \frac{(f_{Load[K-1]} - f_{grid})}{f_M - f_{grid}}\right],$$

wherein $\theta_F$ represents a control phase angle of the output current, $\theta_M$ represents a maximum control phase angle of the output current, $f_{[K-1]}$ represents a frequency measured in a previous cycle, $f_M$ represents a measured frequency, and $f_{grid}$ represents a rated frequency of a grid which is electrically connected with an output terminal of the inverter.

13. A photovoltaic generation system having an anti-islanding protection function, the system comprising:
a means for not shifting a phase of an output current of an inverter when a frequency of an output voltage of the inverter is less than a first threshold value;
a means for gradually increasing the phase of the output current of the inverter when the frequency of the output voltage of the inverter is greater than the first threshold value and is less than a second threshold value; and
a means for fixing the phase of the output current of the inverter at a predetermined value and separating an energy supply source of the inverter from a grid when the frequency of the output voltage of the inverter is greater than the second threshold value,
wherein current amplitude and phase control signals for controlling the inverter are generated in a stationary coordinate system.

14. An anti-islanding protection method of a photovoltaic generation system, the method comprising the steps of:
not shifting a phase of an output current of an inverter when a frequency of an output voltage of the inverter is less than a first threshold value;
gradually increasing the phase of the output current of the inverter when the frequency of the output voltage of the inverter is greater than the first threshold value and is less than a second threshold value; and
fixing the phase of the output current of the inverter at a predetermined value and separating an energy supply source of the inverter from a grid when the frequency of the output voltage of the inverter is greater than the second threshold value,
wherein current amplitude and phase control signals for controlling the inverter are generated in a stationary coordinate system.

* * * * *